United States Patent Office 3,150,140
Patented Sept. 22, 1964

3,150,140
6-OXA- AND 6-AZA-STEROIDS
Alexander D. Cross, Fred A. Kincl, and Albert Bowers, Mexico City, Mexico, assignors, by mesne assignments, to Syntex Corporation, a corporation of Panama
No Drawing. Filed Feb. 21, 1962, Ser. No. 174,683
Claims priority, application Mexico Jan. 23, 1962
27 Claims. (Cl. 260—287)

The present invention relates to new cyclopentanophenanthrene derivatives and to a method for the preparation thereof.

More particularly, the present invention relates to 6-aza and 6-oxa pregnane derivatives.

The novel compounds object of the present invention are represented by the following formulas:

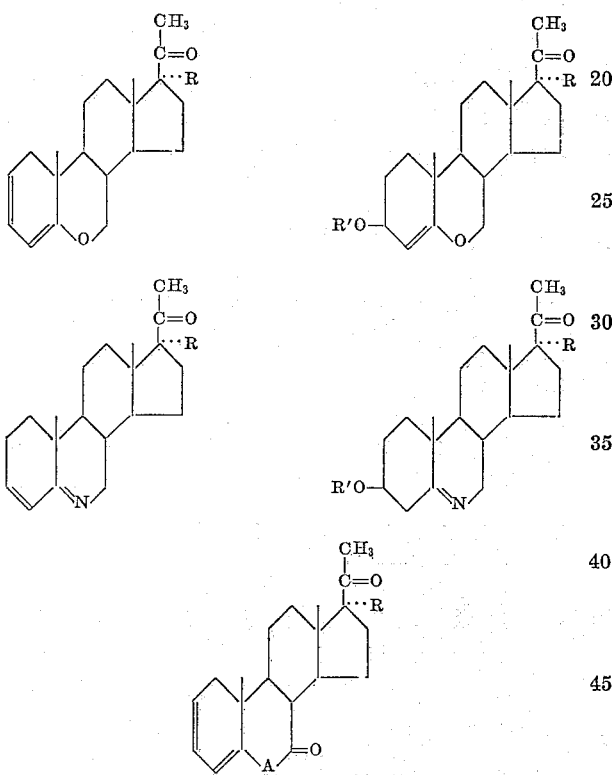

In the above formulas A represents —O— or

—N—
|
H

R represents hydrogen, hydroxyl or a hydrocarbon carboxylic acyloxy group of less than 12 carbon atoms; and $R^1$ represents hydrogen or a hydrocarbon carboxylic acyl group of less than 12 carbon atoms.

The acyl group and the acyloxy group derive from hydrocarbon carboxylic acids of less than 12 carbon atoms, which may be saturated or unsaturated, of straight, branched, cyclic or mixed aliphatic-cyclic chain, or aromatic, and may be substituted with functional groups such as hydroxyl, alkoxy of up to 5 carbon atoms, acyloxy of up to 12 carbon atoms, nitro, amino or halogen. Typical of such ester groups are the acetate, propionate, enanthate, benzoate, trimethylacetate, t-butylacetate, phenoxyacetate, cyclopentylpropionate, aminoacetate and β-chloropropionate.

The compounds represented by the above formulas are progestational agents of use in fertility control. Furthermore, they are anti-estrogenic, anti-androgenic and anti-gonadotrophic hormones, lower the cholesterol level in the blood, and influence the equilibrium of electrolytes in the body.

The 6-aza compounds of the present invention are prepared by the process illustrated by the following reaction scheme:

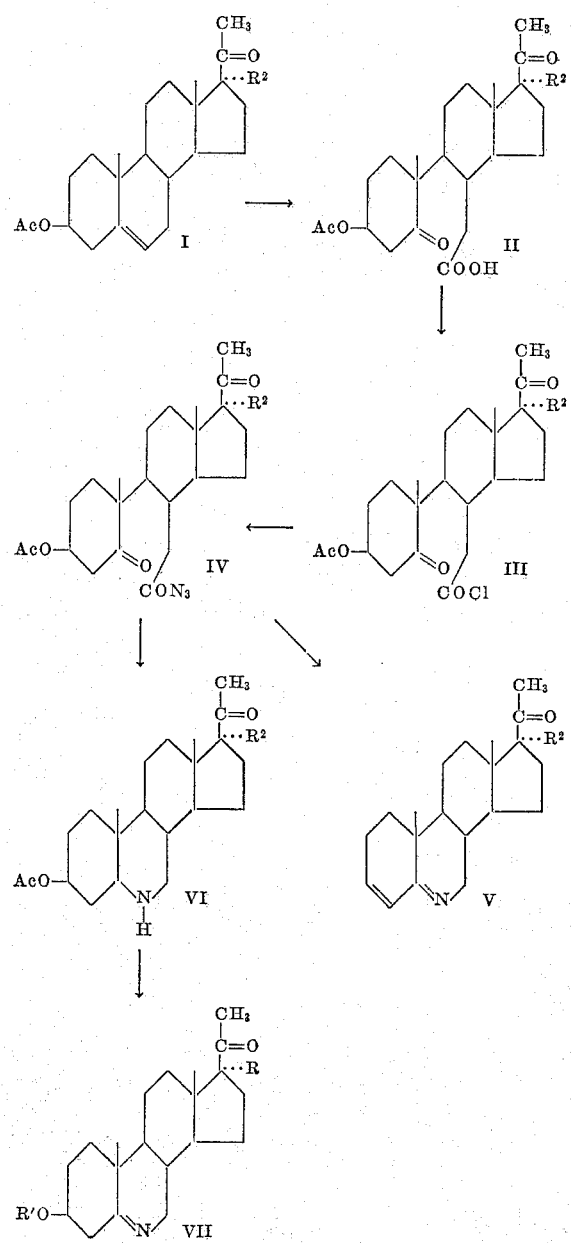

In the preceding formulas R and $R^1$ have the same meaning set forth previously; $R^2$ represents hydrogen or acyloxy and Ac represents the acyl group, preferably the acetyl group.

When carrying out the process set forth above, the starting compound (I), which is an acylate of pregnenolone of a diacylate of 17α-hydroxy-pregnenolone, preferably the respective acetates, is treated with ozone, followed by hydrogen peroxide, to produce in this manner 3β - acetoxy - 5,6 - seco - pregnene - 5,20 - dione - 6 - carboxylic acid or its 17α-acetoxy derivative (II). These acids, upon treatment with a chlorinating agent, preferably thionyl chloride, produce the respective acid chlorides (III), which on reaction with sodium azide produce the azides of the respective acids (IV). These azides are allowed to react with acetic acid at steam bath temperature, thus affording 6-aza-$\Delta^{3,5}$-pregnadien-20-one or its 17α-acetoxy derivative (V). By conventional saponification of the latter with an alkali hydroxide, there is obtained the free 17α-alcohol.

By following a second sequence of reactions the azides represented by Formula IV upon treatment with an amide, preferably with dimethylformamide, produce 3β - acetoxy - 5,7 - seco - 6 - nor - pregnan - 20 - one - 7-isocyanate or its 17α-acetoxy derivative, which on hydrogenation in the presence of an adequate catalyst, such is platinum oxide, furnish 3β-acetoxy-6-aza-pregnan-20-one and its 17α-acetoxy derivatives (VII), respectively. The reaction of these compounds with hypochlorous acid produces the corresponding N-chloro derivatives, which on treatment with an alkali hydroxide, for example with sodium hydroxide in methanol solution, produces 6-aza-$\Delta^5$-pregnen-3β-ol-20-one or its 17α-hydroxy derivative (VII; $R^1$=H; or R=H or OH).

The 6-oxa-pregnanes of the present invention are produced by the process illustrated as follows:

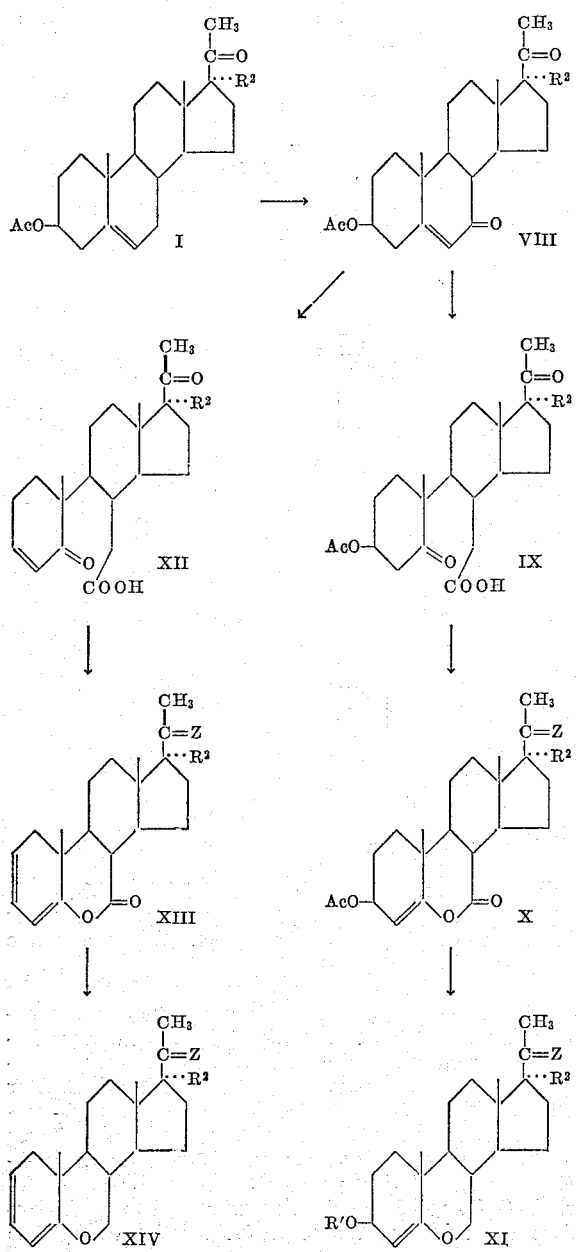

In the above formulas R, $R^1$ and $R^2$ and Ac have the same meaning set forth above; Z may be O or

The process outlined above is conducted in practice by treating the starting compound (I), which is of the type set forth previously, with terbutyl chromate, acetic acid and acetic anhydride, followed by oxalic acid, to produce the corresponding 7-keto derivatives (VIII). By oxidation of these derivatives with a periodate and an alkali permanganate, followed by chromatography of the resulting mixture, there is obtained 3β-acetoxy-5,7-seco-6-nor-pregnane-5,20-dione-7-carboxylic acid or its 17α-acetoxy derivative (IX), and 5,7-seco-6-nor-$\Delta^3$-pregnene-5,20-dione-7-carboxylic acid or its 17α-acetoxy derivative (XII).

The compounds represented by Formula IX, by reaction with acetic anhydride and sodium acetate at reflux temperature for a period of time of approximately 16 hours, produce 3β-acetoxy-6-oxa-$\Delta^4$-pregnene-7,20-dione or its 17α-acetoxy derivative (X; Z=O). These compounds, by conventional treatment with ethyleneglycol in the presence of p-toluenesulfonic acid, produce the respective 20-cycloethylenedioxy derivatives

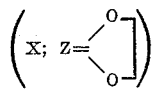

which by reaction with lithium aluminum hydride in the presence of boron trifluoride etherate produce 20-cycloethylenedioxy-6-oxa-$\Delta^4$-pregnen-3α-ol or its 17α-hydroxy derivative

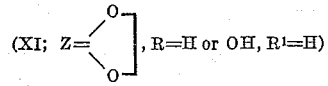

Conventional hydrolysis of the 20-cycloethylenedioxy group in acid medium gives rise to the respective 20-ketones (XI; Z=O, R=H or OH, $R^1$=H).

Following the second sequence of reactions, 5,7-seco-6-nor-$\Delta^3$-pregnene-5,20-dione-7-carboxylic acid or its 17α-acetoxy derivative (XII), on treatment with acetic acid and sodium acetate at reflux temperature, for a period of time of approximately 16 hours, furnished 6-oxa-$\Delta^{2,4}$-pregnadiene-7,20-dione or its 17α-acetoxy derivative (XIII; Z=O), which by conventional treatment with ethylene glycol in the presence of p-toluenesulfonic acid, produced with respective 20-cycloethylenedioxy derivative

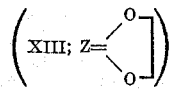

These compounds were allowed to react with lithium aluminum hydride in the presence of boron trifluoride etherate to produce 20-cycloethylenedioxy-6-oxa-$\Delta^{2,4}$-pregnadiene or its 17α-hydroxylated derivative

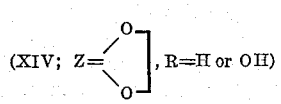

which on hydrolysis of the 20-cycloethylenedioxy group furnished the corresponding 20-ketones (XIV; Z=O, R=H or OH).

The 6-aza-$\Delta^{3,5}$-pregnadienes object of the present invention, as well as the new intermediate products, may also be produced by a method different from the one already set forth, which is illustrated by the following equation:

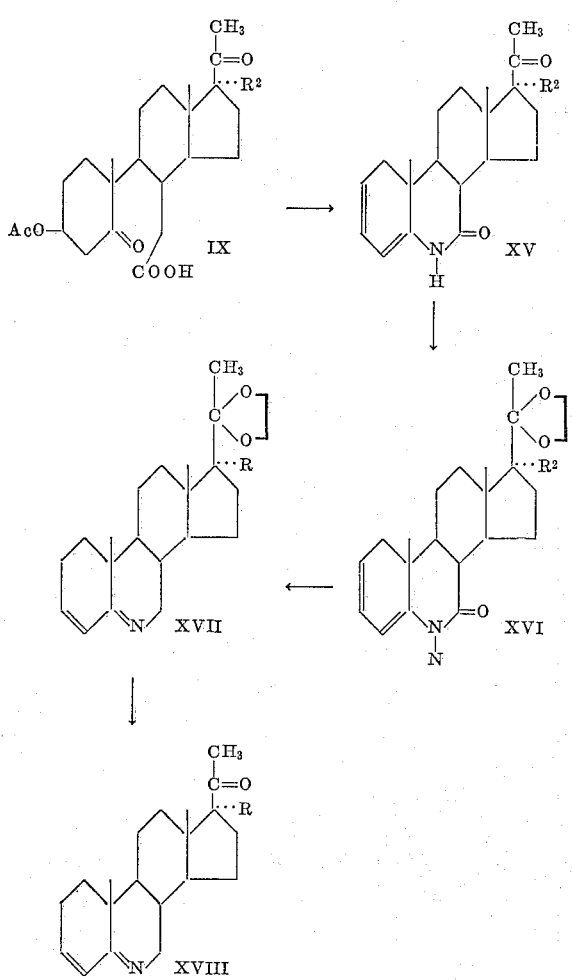

In the above formulas R, R² and Ac have the same meaning set forth previously.

When practicing the process outlined above, the starting compound, which is 3β-acetoxy-5,7-seco-6-nor-pregnane-5,20-dione-7 - carboxylic acid, or its 17α - acetoxy derivative (IX), is treated with ammonia at about 110° C. for a period of time of around 20 hours, thus giving 6-aza-$\Delta^{2,4}$-pregnadiene-7,20-dione or its 17α-acetoxylated derivative (XV), which by conventional treatment with ethylene glycol in the presence of p-toluenesulfonic acid, is converted into the respective 20-cycloethyleneketal (XVI). This ketal is then treated with lithium aluminum hydride to produce 20-cycloethylenedioxy - 6 - aza-$\Delta^{3,5}$-pregnadiene or its 17α-hydroxy derivative (XVII; R=H or OH), which on acid hydrolysis by conventional methods furnish the 20-ketones (XVIII; R=H or OH).

The compounds obtained by the processes described so far, having a secondary hydroxyl group in the molecule (VII, XI; R¹=H), are conventionally acylated in pyridine with an acylating agent, such as the anhydrides derived from hydrocarbon carboxylic acids by the type set forth previously, thus giving the corresponding acylates (VII, XI; R¹=acyl).

The compounds having a tertiary hydroxyl group in the molecule (V, VII, XI, XIV, XVIII; R=OH) are conventionally esterified in the presence of p-toluenesulfonic acid with an acylating agent, such as for example propionic and caproic anhydrides, thus giving the corresponding esters (V, VII, XI, XIV, XVIII; R=acyloxy).

The following specific examples serve to illustrate but are not intended to limit the scope of the present invention:

*Example I*

A solution of 5.2 g. of pregnenolone acetate in 50 cc. of glacial acetic acid and 50 cc. of ethyl acetate was placed in an ozonization tube and cooled in an ice-salt bath. A stream of ozone was introduced for 2 hours (0.024 mol per hour), then 20 cc. of water and 3 cc. of 30% hydrogen peroxide were added and the mixture was stirred vigorously. The mixtures was heated for half an hour on the steam bath and then kept at room temperature for 48 hours.

The resulting solution was concentrated to a small volume under reduced pressure on the steam bath, diluted with 20 cc. of methanol and poured into water. The mixture was extracted with ether, the extract was washed with water, dried over anhydrous sodium sulfate and evaporated to dryness. Crystallization of the residue from ether-pentane afforded 3β-acetoxy-5,6 - seco-pregnane-5,20-dione-6-carboxylic acid.

*Example II*

A mixture of 5 g. of the above acid, 50 cc. of absolute ether, 5 cc. of dimethylformamide and 2.5 cc. of thionyl chloride was kept for 1 hour at room temperature and poured into ice water. The ether layer was separated, dried over anhydrous sodium sulfate and evaporated to dryness, thus yielding the chloride of 3β-acetoxy-5,6-seco-pregnane-5,20-dione-6-carboxylic acid.

*Example III*

To 4 g. of the above chloride in 80 cc. of acetone, there was added 1.2 g. of sodium azide in 12 cc. of water, the mixture was kept standing for 10 minutes and then poured into water and extracted with ether. The ether extract was washed with water, dried over sodium sulfate and evaporated to dryness, thus giving the azide of 3β-acetoxy-5,6-seco-pregnane-5,20-dione-6-carboxylic acid.

*Example IV*

The above product was dissolved in 15 cc. of acetic acid, treated with 2 cc. of water and the mixture was heated on the steam bath until the evolution of nitrogen ceased. The cooled solution was alkalinized with sodium hydroxide solution and extracted with ether. The ether extract was stirred with 0.5 N aqueous hydrochloric acid solution and the acid layer was separated and alkalinized. It was then heated to evaporate the ether which remained in solution and the precipitate formed was collected by filtration, dried and recrystallized from acetone, thus yielding 6-aza-$\Delta^{3,5}$-pregnadien-20-one.

*Example V*

4 g. of the azide obtained in accordance with Example III was mixed with 10 cc. of dimethylformamide and heated on the steam bath until the evolution of nitrogen ceased (approximately 5 minutes). There was then added 2 cc. of water and the solution was colled, thus precipitating in crystalline form the 3β-acetoxy-5,7-seco-6-norpregnan-20-one-7-isocyanate.

*Example VI*

A solution of 2 g. of the above compound in 100 cc. of acetic acid was stirred under an atmosphere of nitrogen with 200 mg. of platinum oxide until the uptake of one molar equivalent of hydrogen. The catalyst was removed by filtration and the filtrate was evaporated to dryness under reduced pressure.

By crystallization from acetonitrile, there was obtained 3β-acetoxy-6-aza-pregnan-20-one.

*Example VII*

To 2 g. of the above compound in 50 cc. of absolute ether was added 5 cc. of a 1 M ether solution of hypochlorous acid and the resulting mixture was kept standing for 5 minutes and then treated with 5 cc. of cold 0.5 N sulfuric acid. The mixture was washed with 0.5 N sodium hydroxide and the ether layer was separated, dried and evaporated, thus leaving as a residue the N-chloro derivative of the starting compound. This derivative was boiled under reflux with 40 cc. of 5% methanolic sodium hydroxide solution for 1 hour and then cooled and diluted with water. The precipitate formed was collected, dried and recrystallized from acetone, thus furnishing 6-aza-$\Delta^5$-pregnen-3$\beta$-ol-20-one.

Example VIII

A solution of 5 g. of 17$\alpha$-hydroxypregnenolone in 100 cc. of anhydrous benzene was treated with 1 g. of p-toluenesulfonic acid and 10 cc. of acetic anhydride and the mixture was kept at room temperature for 24 hours, then poured into ice water and the resulting mixture was stirred in order to hydrolyze the excess of anhydride. The benzene layer was separated, washed with 10% sodium carbonate solution and water, dried and evaporated to dryness. Crystallization of the residue from ether-hexane furnished 3$\beta$,17$\alpha$-diacetoxy-$\Delta^5$-pregnen-20-one.

This compound was treated in accordance with the methods of the preceding examples, thus giving sucessively 3$\beta$,17$\alpha$-diacetoxy-5,6-seco-pregnane-5,20-dione - 6-carboxylic acid, the chloride of 3$\beta$,17$\alpha$-diacetoxy-5,6-seco-pregnane-5,20-dione-6-carboxylic acid, the azide of 3$\beta$,17$\alpha$-diacetoxy-5,6-seco-pregnane - 5,20 - dione-6-carboxylic acid, 17$\alpha$-acetoxy-6-aza-$\Delta^{3,5}$-pregnadien-20-one, 3$\beta$,17$\alpha$-diacetoxy-5,7-seco - 6 - nor-pregnan-20-one-7-isocyanate, 3$\beta$,17$\alpha$-diacetoxy-6-aza-pregnan-20-one and 6-aza-$\Delta^5$-pregnene-3$\beta$,17$\alpha$-diol-20-one.

Example IX 5 g. of 3$\beta$,17$\alpha$-diacetoxy-$\Delta^5$-pregnen-20-one (obtained in accordance with the preceding example) was suspended in 50 cc. of carbon tetrachloride and heated to 80° C. Then, under vigorous stirring, there was added dropwise over a period of 30 minutes 36 cc. of a solution of terbutyl chromate [prepared according to Heusler et al., Helv. Chim. Acta, 35, 284 (1952)], in carbon tetrachloride, 12 cc. of acetic acid and 5 cc. of acetic anhydride. The stirring was continued for 10 hours further, maintaining the temperature at 80° C. At the end of this time the mixture was cooled in ice and treated dropwise with a solution of 7.5 g. of oxalic acid in 75 cc. of water, over a period of 45 minutes. After 15 minutes, there was added 5 g. of solid oxalic acid, and the resulting mixture was stirred for 2 hours. The carbon tetrachloride layer was separated and the aqueous phase was extracted with more solvent. The combined organic fraction were washed with sodium bicarbonate solution and water, dried over anhydrous sodium sulfate and evaporated to dryness. The residue was crystallized from ether, thus affording 3$\beta$,17$\alpha$-diacetoxy-$\Delta^5$-pregnene-7,20-dione.

Example X

To a stirred solution of 5 g. of the above product in 300 cc. of an azeotropic mixture of t-butanol and water was added 2.8 g. of potassium carbonate dissolved in 80 cc. of water, followed by 50 cc. of a solution of 20 g. of sodium periodate in 250 cc. of water and 5 cc. of a 0.8% solution of potassium permanganate in water. The rest of the periodate solution was then added little by little, adding the necessary further amounts of the permanganate solution to maintain the characteristic color.

After keeping the resulting mixture for 2 hours, the excess of permanganate was destroyed with sodium bisulfite solution and the mixture was concentrated to a volume of 400 cc., cooled to 4° C., acidified with ice cold 50% sulfuric acid and extracted with methylene chloride. The organic solution was washed with aqueous sodium bisulfite solution until free of iodine, then with water to neutral, dried and evaporated to dryness. The residue was chromatographed on silica gel, thus separating into two products which after recrystallization from acetone-hexane afforded 17$\alpha$-acetoxy-5,7-seco-6-nor-$\Delta^3$-pregnene-5,20-dione-7-carboxylic acid and 3$\beta$,17$\alpha$-diacetoxy-5,7-seco-6-nor-pregnane-6,20-dione-7-carboxylic acid.

Example XI

A mixture of 3 g. of the last product, 50 cc. of acetic anhydride and 3 g. of sodium acetate was refluxed for 16 hours under an atmosphere of nitrogen and then poured into water. The product was extracted with methylene chloride and the extract was washed with water to neutral, dried and evaporated to dryness. Crystallization of the residue from acetone-hexane yielded 3$\beta$,17$\alpha$-diacetoxy-6-oxa-$\Delta^4$-pregnene-7,20-dione.

Example XII

17$\alpha$ - acetoxy - 5,7 - seco - 6 - nor - $\Delta^3$ - pregnene - 5,20-dione-7-carboxylic acid was treated in accordance with the method of Example XI, thus affording 17$\alpha$-acetoxy-6-oxa-$\Delta^{2,4}$-pregnadiene-7,20-dione.

Example XIII

A mixture of 1 g. of the above compound, 25 cc. of anhydrous benzene, 5 cc. of ethylene glycol and 50 mg. of p-toluenesulfonic acid monohydrate was refluxed with the use of a water separator, for 16 hours. The mixture was then washed with sodium bicarbonate solution and water, dried and evaporated to dryness. Recrystallization of the residue from acetone-hexane afforded 20-cycloethylenedioxy-17$\alpha$-acetoxy-6-oxa-$\Delta^{2,4}$-pregnadien-7-one.

Example XIV 1 g. of the above product was dissolved in 12 cc. of boron trifluoride etherate, diluted with 75 cc. of ether and added at 0° C. to a stirred suspension of 1.2 g. of lithium aluminum hydride in 75 cc. of ether.

After 45 minutes in the ice bath, followed by 2 hours under reflux, the excess of reagent was destroyed by the cautious addition of ethyl acetate and then water was added. The organic layer was separated, dried over anhydrous sodium sulfate and evaporated to dryness. Recrystallization of the residue from acetone-hexane yielded 20-cycloethylenedioxy-6-oxa-$\Delta^{2,4}$-pregnadien-17$\alpha$-ol.

Example XV

A solution of 500 mg. of the above compound in 25 cc. of acetone was treated with 0.1 cc. of concentrated hydrochloric acid and the mixture was kept overnight at room temperature. After pouring into water, it was extracted with methylene chloride and the organic layer was washed with water to neutral, dried over anhydrous sodium sulfate and evaporated to dryness. By recrystallization from acetone-hexane, there was obtained 6-oxa-$\Delta^{2,4}$-pregnadien-17$\alpha$-ol-20-one.

Example XVI

3$\beta$,17$\alpha$ - diacetoxy - 6 - oxa - $\Delta^4$ - pregnene - 7,20 - dione was treated in accordance with the method of Example XIII, thus producing 20-cycloethylenedioxy-3$\beta$,17$\alpha$-diacetoxy-6-oxa$\Delta^4$-pregnen-7-one.

Example XVII

The above compound was treated in accordance with the method described in Example XIV, thus yielding 20-cycloethylenedioxy-6-oxa-$\Delta^4$-pregnene-3$\beta$,17$\alpha$-diol.

Example XVIII

The preceding steroid was treated in accordance with the method of Example XV, thus giving 6-oxa-$\Delta^4$-pregnene-3$\beta$,17$\alpha$-diol-20-one.

Example XIX

A stream of ammonia was introduced for 45 minutes at 0° C. into a solution of 250 mg. of 3$\beta$,17$\alpha$-diacetoxy-5,7-seco-6-nor-pregnane-5,20-dione-7-carboxylic acid in 20 cc. of ethanol, placed in a thick glass tube. The tube was cooled to −80° C. and sealed. It was then heated to 110° C. and this temperature was maintained for 20 hours. Upon cooling, there was obtained a crystalline precipitate of 17α-acetoxy-6-aza-Δ²,⁴-pregnadien-7,20-dione.

*Example XX*

The above dione was treated in accordance with the method of Example XIII, thus giving 20-cycloethylenedioxy-17α-acetoxy-6-aza-Δ²,⁴-pregnadien-7-one.

*Example XXI*

A solution of 1 g. of the preceding compound in 50 cc. of tetrahydrofuran was added over a period of 30 minutes to a stirred suspension of 1 g. of lithium aluminum hydride in 50 cc. of anhydrous tetrahydrofuran. The mixture was refluxed for 19 hours, cooled and cautiously treated with 5 cc. of ethyl acetate and 2 cc. of water. Sodium sulfate was added, the inorganic material was removed by filtration and thoroughly washed with hot ethyl acetate; the combined organic solution was evaporated to produce a crude product which was purified by crystallization from acetone-hexane, thus furnishing 20-cycloethylenedioxy-6-aza-Δ³,⁵-pregnadien-17β-ol.

*Example XXII*

The above alcohol was treated by the method of Example XVI, thus producing 6-aza-Δ³,⁵-pregnadien-17α-ol-20-one.

*Example XXIII*

Pregnenolone acetate was treated in accordance with Example IX and X, thus affording successively 3β-acetoxy-Δ⁵-pregnene-7,20-dione, 5,7-seco-6-nor-Δ³-pregnene-5,20-dione-7 carboxylic acid and 3β-acetoxy-5,7-seco-6-nor-pregnane-5,20-dione-7-carboxylic acid.

*Example XXIV*

The latter acid was treated in accordance with Example XI, thus yielding 3β-acetoxy-6-oxa-Δ⁴-pregnene-7,20-dione.

*Example XXV*

The 5,7-seco-6-nor-Δ³-pregnene-520-dione-7-carboxylic acid obtained in Example XXIII was treated by the methods of Examples XI, XIII, XIV and XV, thus giving successively 6-oxa-Δ²,⁴-pregnadiene-7,20-dione, 20-cycloethylenedioxy-6-oxa-Δ²,⁴-pregnadien-7-one, 20-cycloethylenedioxy-6-oxa-Δ²,⁴-pregnadiene and 6-oxa-Δ²,⁴-pregnadien-20-one.

*Example XXVI*

The 3β-acetoxy-6-oxa-Δ⁴-pregnene-7,20-dione obtained in Example XXIV was treated in accordance with the methods of Examples XIII, XIV and XV, thus yielding successively 20 - cycloethylenedioxy - 3β - acetoxy - 6-oxa-Δ⁴-pregnen-7-one, 10-cycloethylenedioxy-6-oxa-Δ⁴-pregnen-3β-ol and 6-oxa-Δ⁴-pregnen-3β-ol-20-one.

*Example XXVII*

The 3β - acetoxy - 5,7 - seco - 6 - nor - pregnane - 5,20-dione-7-carboxylic acid described in Example XXIII was treated in accordance with the methods of Examples XIX, XX, XXI and XXII, thus affording successively 6-aza-Δ²,⁴ - pregnadiene - 7,20 - dione, 20 - cycloethylenedioxy-6-aza-Δ²,⁴-pregnadien-7-one, 20-cycloethylenedioxy-6-aza-Δ³,⁵-pregnadiene- and 6-aza-Δ³,⁵-pregnadien-20-one.

*Example XXVIII*

A mixture of 1 g. of 6-oxa-Δ⁴-pregnen-3β-ol, 4 cc. of pyridine and 2 cc. of propionic anhydride was kept overnight at room temperature, then poured into ice water and the precipitate formed was collected by filtration, washed with water and dried. By crystallization from acetone-hexane, there was obtained the propionate of 6-oxa-Δ⁴-pregnen-3β-ol-20-one.

By the same method, 6-oxa-Δ⁴-pregnene-3β,17α-diol-20-one was converted into the 3-propionate of 6-oxa-Δ⁴-pregnene-3β,17α-diol-20-one.

*Example XXIX*

6-aza-Δ⁵-pregnene-3β,17α-diol-20-one and 6-aza-Δ⁵-pregnen-3β-ol-20-one were treated by the process described in the preceding example, thus giving respectively 6-aza-Δ⁵-pregnene-3β,17α-diol-20-one 3-propionate and 6-aza-Δ⁵-pregnen-3β-ol-20-one propionate.

*Example XXX*

A solution of 5 g. of 6-oxa-Δ²,⁴-pregnadien-17α-ol-20-one in 100 cc. of anhydrous benzene was treated with 1 g. of p-toluenesulfonic acid and 10 cc. of caproic anhydride and the mixture was kept for 24 hours at room temperature, then poured into ice water and the resulting mixture was stirred in order to hydrolyze the excess of anhydride. The benzene layer was separated, washed with 10% sodium carbonate solution and water, dried and evaporated. Crystallization of the residue from ether-hexane furnished 6-oxa-Δ²,⁴-pregnadien-17α-ol-20-one caproate.

By following the same process, 6-aza-Δ³,⁵-pregnadien-17β - ol-20-one, 6-aza-Δ⁵-pregnene-3β,17α-diol-20-one-3-propionate, 6-aza-Δ⁵-pregnene-3β,17α-diol-20-one, 6-oxa-Δ⁴-pregnene-3β,17α-diol-20-one-3-propionate, and 6-oxa-Δ⁴-pregnene-3β,17α-diol-20-one were treated to produce respectively the caproate of 6-aza-Δ³,⁵-pregnadien-17α-ol-20-one, the 3-propionate-17-caproate of 6-aza-Δ⁵-pregnene-3β,17α-diol-20-one, the 3,17-dicaproate of 6-aza-Δ⁵-pregnene-3β,17α-diol-20-one, the 3-propionate-17-caproate of 6-oxa-Δ⁴-pregnene-3β,17α-diol-20-one and the 3,17-dicaproate of 6-oxa-Δ⁴-pregnene-3β,17α-diol.

We claim:

1. A compound of the following formula:

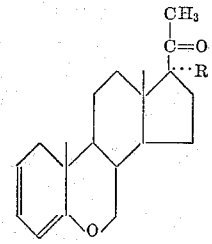

wherein R is selected from the group consisting of hydrogen, hydroxy and hydrocarbon carboxylic acyloxy of less than 12 carbon atoms.

2. 6-oxa-Δ²,⁴-pregnadien-20-one.
3. 6-oxa-Δ²,⁴-pregnadien-17α-ol-20-one.
4. 6-oxa-Δ²,⁴-pregnadien-17α-ol-20-one-caproate.
5. A hydrocarbon carboxylic acid ester of less than 12 carbon atoms of 6-oxa-Δ²⁴-pregnadien-17α-ol-20-one.
6. A compound of the following formula:

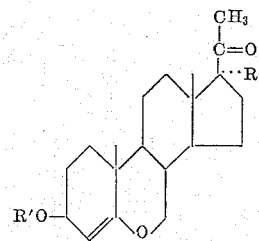

wherein R is selected from the group consisting of hydrogen, hydroxy and hydrocarbon carboxylic acyloxy of less than 12 carbon atoms, and R¹ is selected from the group consisting of hydrogen and hydrocarbon carboxylic acyl of less than 12 carbon atoms.

7. 6-oxa-Δ⁴-pregnene-3β,17α-diol-20-one.
8. 6-oxa-Δ⁴-pregnen-3β-ol-20-one.
9. A hydrocarbon carboxylic acid ester of less than 12 carbon atoms of 6-oxa-Δ⁴-pregnen-3β-ol-20-one.
10. 6-oxa-Δ⁴-pregnen-3β-ol-20-one propionate.

11. A hydrocarbon carboxylic acid ester of less than 12 carbon atoms of 6-oxa-$\Delta^4$-pregnene-3$\beta$,17$\alpha$-diol-20-one.

12. The 3-propionate of 6-oxa-$\Delta^4$-pregnene-3$\beta$,17$\alpha$-diol-20-one.

13. A compound of the following formula:

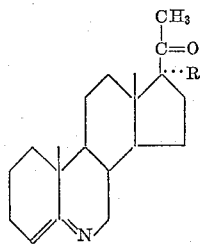

wherein R is selected from the group consisting of hydrogen, hydroxy and hydrocarbon carboxylic acyloxy of less than 12 carbon atoms.

14. 6-aza-$\Delta^{3,5}$-pregnadien-20-one.
15. 6-aza-$\Delta^{3,5}$-pregnadien-17$\alpha$-ol-20-one.
16. 17$\alpha$-acetoxy-6-aza-$\Delta^{3,5}$-pregnadien-20-one.
17. 6-aza-$\Delta^{3,5}$-pregnadien-17$\alpha$-ol-20-one caproate.
18. A compound of the following formula:

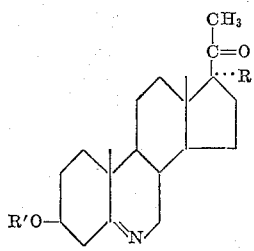

wherein R is selected from the group consisting of hydrogen, hydroxy and hydrocarbon carboxylic acyloxy of less than 12 carbon atoms, and $R^1$ is selected from the group consisting of hydrogen and hydrocarbon carboxylic acyl of less than 12 carbon atoms.

19. 6-aza-$\Delta^5$-pregnen-3$\beta$-ol-20-one.
20. 6-aza-$\Delta^5$-pregnene-3$\beta$,17$\alpha$-diol-20-one.
21. 6-aza-$\Delta^5$-pregnene-3$\beta$,17$\alpha$-diol-20-one-3-propionate.
22. 6-aza-$\Delta^5$-pregnen-3$\beta$-ol-20-one-3-propionate.
23. A compound of the following formula:

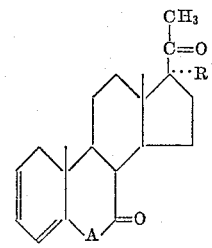

wherein R is selected from the group consisting of hydrogen, hydroxy and hydrocarbon carboxylic acyloxy of less than 12 carbon atoms, and A is selected from the group consisting of —O— and

24. 6-oxa-$\Delta^{2,4}$-pregnadiene-7,20-dione.
25. 6-aza-$\Delta^{2,4}$-pregnadiene-7,20-dione.
26. The acetate of 6-aza-$\Delta^{24}$-pregnadien-17$\alpha$-ol-7,20-dione.
27. The acetate of 6-oxa-$\Delta^{2,4}$-pregnadien-17$\alpha$-ol-7,20-dione.

References Cited in the file of this patent

UNITED STATES PATENTS

| | | |
|---|---|---|
| 3,022,312 | Wildi | Feb. 20, 1962 |
| 3,023,227 | Atwater | Feb. 27, 1962 |
| 3,080,380 | Atwater | Mar. 5, 1963 |

FOREIGN PATENTS

| | | |
|---|---|---|
| 1,118,197 | Germany | Nov. 30, 1961 |